(12) United States Patent
Mountain

(10) Patent No.: US 8,629,623 B2
(45) Date of Patent: Jan. 14, 2014

(54) SMART ILLUMINATION FOR ELECTRONIC DEVICES

(75) Inventor: Dale Llewelyn Mountain, Silsden (GB)

(73) Assignee: EchoStar Technologies L.L.C., Englewood, CO (US)

( * ) Notice: Subject to any disclaimer, the term of this patent is extended or adjusted under 35 U.S.C. 154(b) by 319 days.

(21) Appl. No.: 13/097,004

(22) Filed: Apr. 28, 2011

(65) Prior Publication Data

US 2012/0274218 A1   Nov. 1, 2012

(51) Int. Cl.
*H05B 37/00* (2006.01)
(52) U.S. Cl.
USPC .................. 315/200 A; 315/291; 315/312
(58) Field of Classification Search
USPC ...... 315/291–292, 294, 312, 316, 152, 200 A
See application file for complete search history.

(56) References Cited

U.S. PATENT DOCUMENTS

| | | | |
|---|---|---|---|
| 5,705,997 A | 1/1998 | Park | |
| 6,664,744 B2 | 12/2003 | Dietz | |
| 7,852,255 B2 * | 12/2010 | Rapisarda | 341/176 |
| 7,960,682 B2 | 6/2011 | Gardner, Jr. | |
| 8,134,475 B2 * | 3/2012 | R. | 340/815.4 |
| 2002/0085128 A1 * | 7/2002 | Stefanik | 348/734 |
| 2010/0231384 A1 | 9/2010 | Reams | |

FOREIGN PATENT DOCUMENTS

WO        00/41378        7/2000

OTHER PUBLICATIONS

Extended European Search Report, dated Aug. 29, 2012, for European Application No. 12165813, 8 pages.

* cited by examiner

*Primary Examiner* — James H Cho
(74) *Attorney, Agent, or Firm* — Seed IP Law Group PLLC

(57) ABSTRACT

A handheld device includes control elements, an illumination element operable to illuminate the control elements, a light sensor that detects an illumination level, and a sensor that detects whether or not the device is being held. When the illumination level is below an ambient light threshold and the device is being held, the illumination element and activates. However, when either the illumination level is not below the ambient light threshold or the handheld electronic device is not being held, the illumination element deactivates and/or does not activate. In some implementations, the sensor includes a capacitance touch switch and/or a resistance touch switch that detects contact with skin, a gyroscope and/or an accelerometer that detects movement of the handheld device, a pressure sensors that detects exertion of pressure on the handheld device, and/or an additional light sensor that detects when a portion of the handheld electronic device is covered.

18 Claims, 6 Drawing Sheets

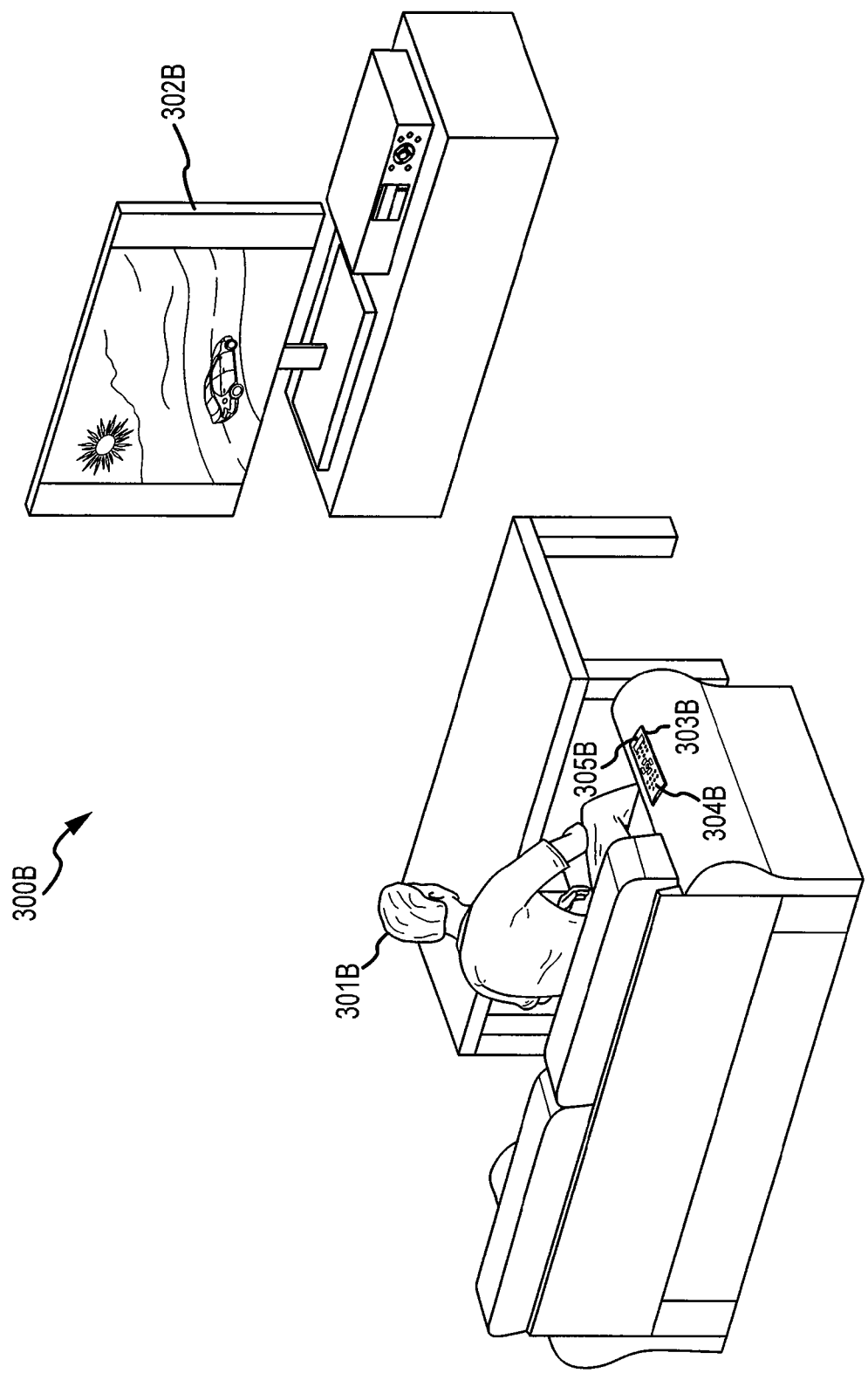

SMART ILLUMINATION FOR ELECTRONIC DEVICES

FIELD OF THE INVENTION

This disclosure relates generally to illumination for electronic devices, and more specifically to handheld electronic devices that control illumination based on light detection and determination that the handheld device is currently being held.

SUMMARY

The present disclosure discloses systems and methods for smart illumination for electronic devices. A handheld electronic device may include a number of control elements and one or more illumination elements that are operable to illuminate the control elements. The handheld electronic device may also include a light sensor that detects an illumination level in an area occupied by the handheld electronic device and one or more sensing units that are operable to detect whether or not the handheld electronic device is being held. When the illumination level detected by the light sensor is below an ambient light threshold and the sensing unit detects that the handheld electronic device is being held, the handheld electronic device may activate the illumination element and illuminate the control elements. However, when either the illumination level detected by the light sensor is equal to or above the ambient light threshold or the sensing unit detects that the handheld electronic device is not being held, the handheld electronic device may deactivate and/or not activate the illumination element.

In one or more implementations, the sensing unit may include one or more capacitance touch switches and/or resistance touch switches that are operable to detect contact with a user's skin, one or more gyroscopes and/or accelerometers that are operable to detect movement of the handheld device by a user, one or more pressure sensors that are operable to detect exertion of pressure on the handheld device by a user, one or more additional light sensors that are operable to detect when a portion of the handheld electronic device is covered by a user's hand, and so on.

In various implementations, the control elements may include one or more translucent buttons and/or keys and the illumination element may be configured operate as a backlight for the one or more translucent buttons or keys. In various other implementations, the illumination element may be configured to point at the control elements from above and/or from a similar direction in order to illuminate the control elements. In still other implementations, the control element may include a touch screen and/or other electronic display based input and/or output component that is darkened unless illuminated by the illumination element.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3D are diagrams illustrating a user utilizing a system for smart illumination for electronic devices. The system may be the system of FIG. 1.

DETAILED DESCRIPTION OF THE EMBODIMENTS

Figure 1:
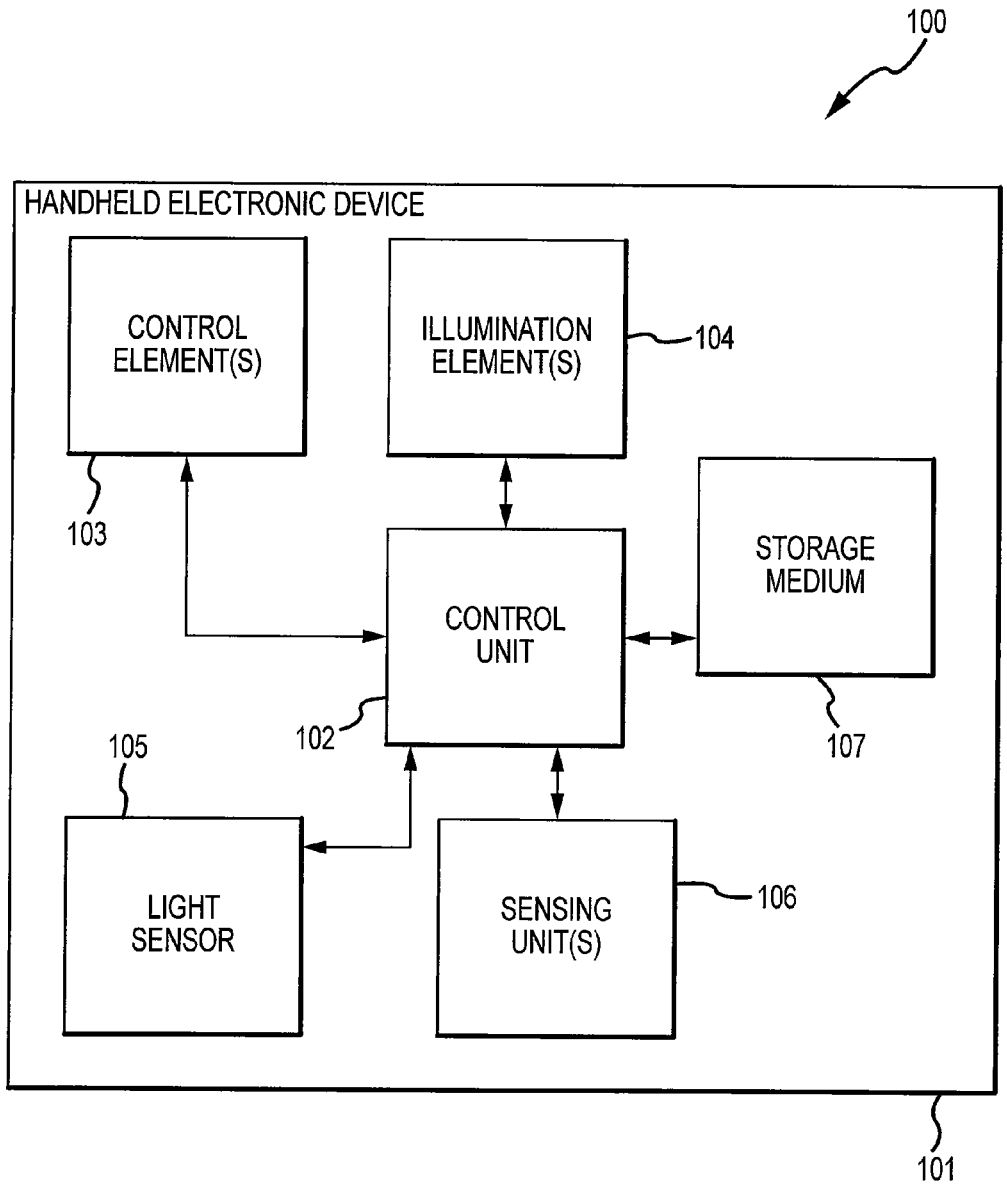
FIG. 1 is a block diagram illustrating a system for smart illumination for electronic devices.

The description that follows includes sample systems, methods, and computer program products that embody various elements of the present disclosure. However, it should be understood that the described disclosure may be practiced in a variety of forms in addition to those described herein.

Handheld electronic devices may include, but are not limited to, such varied devices as remote controls, cellular telephones, smart phones, mobile computing devices, handheld music players, and so on. These handheld electronic devices may include one or more control elements (such as keys, buttons, touch screens, pointer devices, track pads, and so on) that may be utilized to control the operations of the handheld electronic device and/or other associated electronic devices. As these devices may be portable, users may utilize such handheld electronic devices in a variety of different environments, such as environments that are dark and/or otherwise poorly illuminated. Such dark and/or otherwise poorly illuminated conditions may make it difficult for the user to control the operations of the handheld electronic device and/or utilize the handheld electronic device to control the operations of other associated electronic devices utilizing the one or more control elements as the user may not be able to adequately see the control elements.

Illumination elements may be included with the handheld electronic device in order to illuminate the control elements. As such, users may be able to see and therefore utilize the control elements even when using the handheld electronic device in dark and/or poorly illuminated environments. For example, a remote control may include a plurality of buttons and/or keys. The buttons and/or keys may be constructed of a translucent material, such as a clear plastic, and may be illuminated by one or more LEDs (light-emitting diodes) and/or OLEDs (organic light emitting diodes) that are positioned underneath one or more of the buttons and/or keys. Thus, the LEDs and/or OLEDs may function as a backlight for the buttons and/or keys.

However, handheld electronic devices may be powered by one or more batteries and/or other such limited resource power components. Utilizing illumination elements to illuminate control elements may consume a significant amount of the limited power available to such handheld electronic devices from batteries and/or other such components. Regardless of the amount of power available from a battery and/or other such component, any amount of power consumed by illumination elements reduced the amount of power available for other handheld electronic device operations.

Further, users may utilize such handheld electronic devices in dark and/or poorly illuminated environments only part of the time. At other times users may utilize handheld electronic devices in environments that are sufficiently illuminated that the users for the users to be able to see the control elements. Control elements may not need to be illuminated if the user is using the handheld electronic device in an environment that is sufficient illuminated and/or if the handheld electronic device is located in a dark and/or poorly illuminated environment but is not currently being held (indicating that the device is not currently being utilized). Illuminating control elements when such illumination is not necessary (as the environment is sufficiently illuminated and/or the device is not currently being utilized) may consume unnecessary amounts of power that could otherwise be utilized for handheld electronic device operation.

In some implementations, the illumination element may be activated when one or more of the control elements are selected, thus illuminating the control elements. After a period of time after such a selection, the illumination element may then be deactivated. In this way, unnecessary consumption of power by the illumination element may be minimized. However, in such an implementation, a user may have to select the control element to activate the illumination element without being able to see the control element. This may be difficult for the user and may result in selection of unintended control elements, which may result in the performance of unintended operations. For example, a remote control for a television illuminated one or more translucent buttons and/or keys upon selection of one of the buttons and/or keys. A user of such a remote control may accidentally power off the television, stop the content they are watching, erase stored content, or accidentally cause other such operations to be performed when the user merely wishes to alter the volume level and accidentally presses the wrong button and/or key when attempting to illuminate the buttons and/or keys.

The present disclosure discloses systems and methods for smart illumination for electronic devices. A handheld electronic device may include a number of control elements and one or more illumination elements that are operable to illuminate the control elements. The handheld electronic device may also include a light sensor that detects an illumination level in an area occupied by the handheld electronic device and one or more sensing units that are operable to detect whether or not the handheld electronic device is being held (such as one or more capacitance touch switches, resistance touch switches, gyroscopes, accelerometers, pressure sensors, additional light sensors, and/or other such sensing units that detect whether or not the handheld electronic device is being held). When the illumination level detected by the light sensor is below an ambient light threshold and the sensing unit detects that the handheld electronic device is being held, the handheld electronic device may activate the illumination element and illuminate the control elements. However, when either the illumination level detected by the light sensor is equal to or above the ambient light threshold or the sensing unit detects that the handheld electronic device is not being held, the handheld electronic device may deactivate and/or not activate the illumination element. In this way, the handheld electronic device may activate the illumination element when needed and may not activate the illumination element when it is not needed, avoiding unnecessary power consumption.

FIG. 1 is a block diagram illustrating a system 100 for smart illumination for electronic devices. The system 100 includes a handheld electronic device 101 which may be a remote control (such as a remote control operable to control a television, set top box, digital video recorder, digital video disc player, and/or other electronic device), a cellular telephone, a smart phone, a mobile computing device, a handheld music player, and/or other electronic device that is configured for handheld usage. The handheld electronic device may include one or more control units 102, one or more control elements 103, one or more illumination elements 104, one or more light sensors 105, one or more sensing units 106, and one or more non-transitory storage media 107 (which may take the form of, but is not limited to, a magnetic storage medium; optical storage medium; magneto-optical storage medium; read only memory; random access memory; erasable programmable memory; flash memory; and so on).

The control elements 103 may be any kind of selection element operable to receive input for and/or provide output from the handheld electronic device 101. Such control elements may include, but are not limited to, one or more keys, buttons, touch screens, keyboards, virtual keyboards, pointer devices, track pads, and so on. The illumination element may be any kind of illumination device (such as one or more incandescent bulbs, fluorescent lamps, compact fluorescent lamps, cold cathode fluorescent lamps, high-intensity discharge lamps, LEDs, OLEDs, and/or any other illumination devices) that is configured to illuminate one or more of the control elements when activated by the control unit 102.

By way of a first example, the control elements 103 may include one or more translucent buttons and/or keys and the illumination element 104 may be configured operate as a backlight for the one or more translucent buttons or keys. By way of a second example, the illumination element may be configured to point at the control elements from above and/or from a similar direction in order to illuminate the control elements. By way of a third example, the control element may include a touch screen and/or other electronic display based input and/or output component that is darkened unless illuminated by the illumination element.

The light sensor 105 may be any kind of illumination detector that determines an illumination level of an area. In various implementations, the light sensor may compare the detected illumination level with an ambient light threshold (at the direction of the control unit 102 in some implementations), which may be stored in the non-transitory storage medium 107. However, in other implementations the light sensor may communicate the illumination level to the control unit, which may then determine whether the illumination level exceeds the ambient light threshold.

The sensing unit 106 may be any kind of sensor device that is configured to determine (at the direction of the control unit 102 in some implementations) whether or not the handheld electronic device 101 is being held (though in some implementations the sensing unit may provide detected data to the control unit, which may then determine whether or not the handheld device is being held). In various implementations, the sensing unit may be one or more capacitance touch switches, resistance touch switches, gyroscopes, accelerometers, pressure sensors, illumination sensors additional to the light sensor, and/or other such sensor that can be utilized to determine whether or not the handheld electronic device is being held.

By way of a first example, in some implementations the sensing unit 106 may be one or more capacitance touch switches and/or resistance touch switches. As such, the sensing unit may determine that the handheld electronic device 101 is being held if the capacitance touch switch and/or resistance touch switch is in contact with the skin and/or body part of a user. The sensing unit may also determine that the handheld electronic device is not being held if the capacitance touch switch and/or resistance touch switch is not in contact with the skin and/or body part of the user.

By way of a second example, in some implementations the sensing unit 106 may be one or more gyroscopes and/or accelerometers. As such, the sensing unit may determine that the handheld electronic device 101 is being held if the gyroscope and/or accelerometer detects movement, indicating that one or more users are moving the handheld electronic device. The sensing unit may also determine that the handheld electronic device is not being held if the gyroscope and/or accelerometer does not detect movement, indicating that one or more users are one moving the handheld electronic device.

By way of a third example, in some implementations the sensing unit 106 may be one or more pressure sensors. As such, the sensing unit may determine that the handheld electronic device 101 is being held if the pressure sensor detects the exertion of pressure. The sensing unit may also determine that the handheld electronic device is not being held if the pressure sensor does not detect the exertion of pressure.

By way of a fourth example, in some implementations the sensing unit 106 may be one or more illumination sensors additional to the light sensor 105. As such, the sensing unit may determine that the handheld electronic device 101 is being held if the illumination sensor does not detect light, indicating that the illumination sensor is obscured by the hand of one or more users who are holding the handheld electronic device. The sensing unit may also determine that the handheld electronic device is not being held if the illumination sensor does detect light, indicating that the illumination sensor is not obscured by the hand of one or more users holding the handheld electronic device.

The control unit 102 may perform one or more operations to direct activation and/or deactivation of the illumination element 104, such as by executing one or more instructions stored in the non-transitory storage medium 107). The control unit may receive one or more indications from the light sensor 105 (such as data indicating whether the illumination level is below the ambient light threshold) and/or the sensing unit 106 (such as data indicating whether the handheld electronic device 101 is being held). If the illumination level is below the ambient light threshold and the handheld electronic device is being held, the control unit may instruct the illumination element to activate, thus illuminating one or more of the control elements 103. However, if either the illumination level is not below (either equal to and/or above) the ambient light threshold (equal to and/or above) or the handheld electronic device is not being held, the control unit may instruct the illumination element to deactivate (if the illumination element is currently activated) and/or not instruct the illumination element to activate (if the illumination element is not currently activated).

Figure 2:
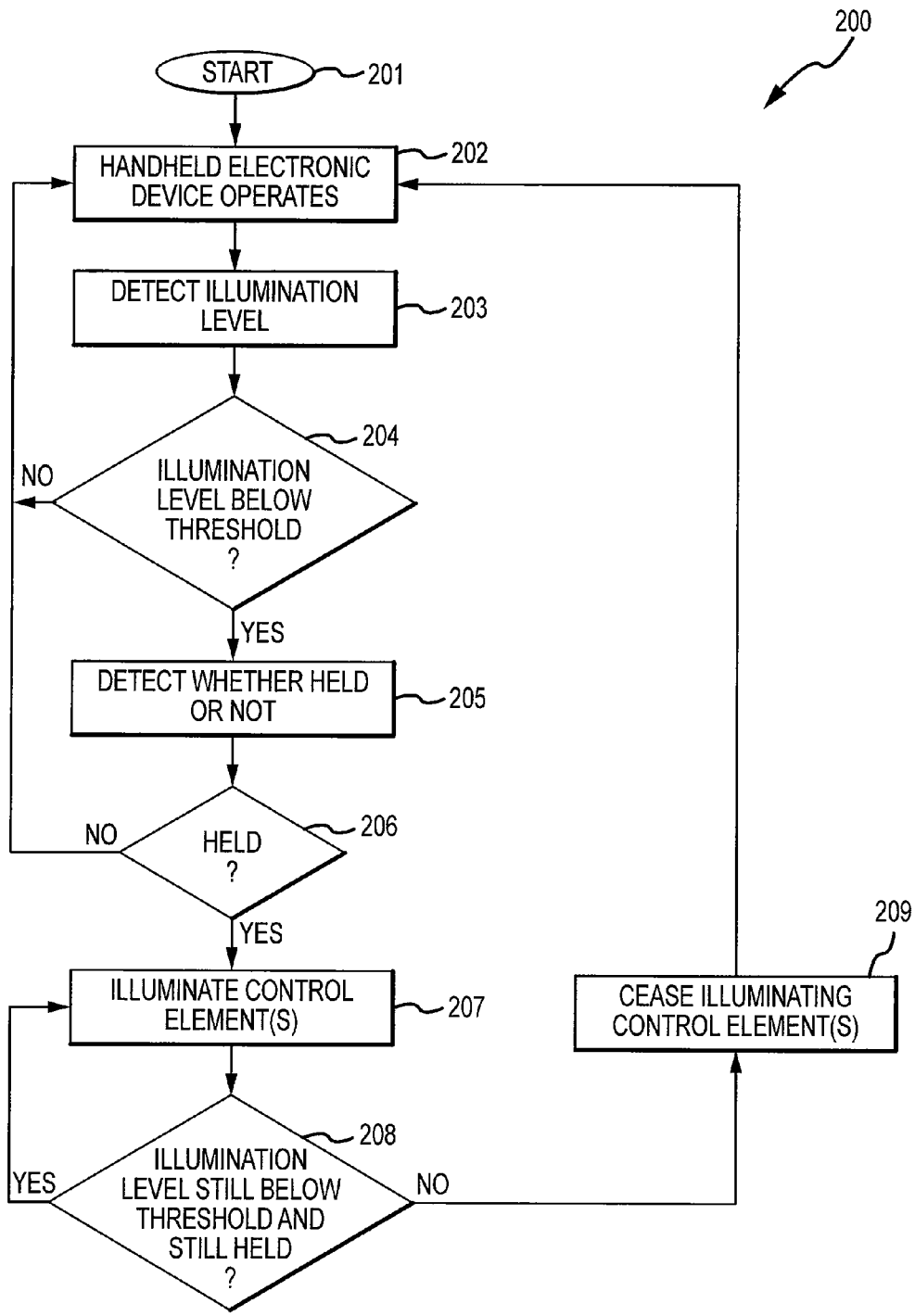
FIG. 2 is a flow chart illustrating a method for smart illumination for electronic devices. This method may be performed by the system of FIG. 1.

FIG. 2 illustrates a method 200 for smart illumination for electronic devices. The method 200 may be performed by the handheld electronic device 101 of FIG. 1. The flow begins at block 201 and proceeds to block 202 where the handheld electronic device operates. The flow then proceeds to block 203 where the light sensor 105 detects the illumination level of the area occupied by the handheld electronic device. Next, the flow proceeds to block 204 where the light sensor and/or the control unit 102 determines whether or not the illumination level is below the ambient light threshold. If not, the flow returns to block 202 where the handheld electronic device continues to operate. Otherwise, the flow continues to block 205.

At block 205, after the light sensor 105 and/or the control unit 102 determines that the illumination level is below the ambient light threshold, the sensing unit 106 detects whether or not the handheld electronic device 101 is being held. The flow then proceeds to block 206 where the sensing unit and/or the control unit determines whether or not the handheld electronic device is detected as being held. If not, the flow returns to block 202 where the handheld electronic device continues to operate. Otherwise, the flow continues to block 207.

At block 207, after the sensing unit 106 and/or the control unit determines that the handheld electronic device 101 is detected as being held, the control unit instructs the illumination element 104 to illuminate one or more of the control elements 103.

The flow then proceeds to block 208 where the control unit 102 determines whether or not the illumination level is still below the ambient light threshold and the handheld electronic device 101 is still being held. If so, the flow returns to block 207 where the control unit continues instructing the illumination element 104 to illuminate one or more of the control elements 103. Otherwise, the flow proceeds to block 209.

At block 209, after the control unit 102 determines that either the illumination level is not still below the ambient light threshold or the handheld electronic device 101 is not still being held, the control unit ceases to instruct the illumination element 104 to illuminate one or more of the control elements 103 and/or instructs the illumination element to cease illuminating the one or more of the control elements. The flow then returns to block 202 where the handheld electronic device continues to operate.

Although the method 200 is illustrated and described above as detecting whether or not to the handheld electronic device 101 is held only after determining that the illumination level is below the ambient illumination threshold, it is understood that this is merely for the purposes of example. In various implementations both whether or not the illumination level is below the ambient illumination threshold and whether or not the handheld electronic device is being held may be simultaneously determined. In various other implementations, determining whether or not the illumination level is below the ambient illumination threshold may be performed only after detecting that handheld electronic device is being held.

Returning to FIG. 1, in some implementations, the control unit 102 may instruct the illumination element 104 to activate for a period of time (such as three seconds) when the illumination level is below the ambient illumination threshold and the handheld electronic device 101 is being held. In such implementations, the illumination element may continue to illuminate during the period of time even if the illumination level is no longer below the ambient illumination threshold or the handheld electronic device is no longer being held. However, if after the expiration of the period of time the illumination level is no longer below the ambient illumination threshold or the handheld electronic device is no longer being held, the illumination element may cease illuminating.

In various implementations, if the sensing unit 106 detects that the handheld electronic device 101 is not being held, the handheld electronic device may ignore input received via one or more of the control elements 103. As the handheld electronic device is not being held, the input may be accidental instead of intentional. For example, if the handheld electronic device is a remote control, the input may be the result of a user sitting on the remote control.

In one or more implementations, if the light sensor 105 is detecting the illumination level while the illumination element 104 is illuminated, the illumination from the illumination element may be accounted for in determining whether or not the illumination level is below the ambient light threshold. Otherwise, in certain situations the illumination element may illuminate because the illumination level is below the ambient light threshold and may then immediately cease illuminating because the additional illumination from the illumination element causes the illumination level to meet and/or exceed the ambient light threshold. By accounting for illumination from the illumination element in determining whether or not the illumination level is below the ambient light threshold, rapid activation and deactivation of the illumination element may be prevented.

In some implementations, the ambient illumination threshold may be adjusted by one or more users. In such implementations, the handheld electronic device 101 may receive input from the user indicating as which illumination level the user can and/or cannot adequately see the control elements 103. This input may be stored in the non-transitory storage medium 107 as the ambient illumination threshold and/or utilized in part to determine the ambient illumination threshold. In this way, as individual users have differing abilities to see the control elements in various lighting conditions, the smart illumination of the control elements may be customized for one or more particular users.

In various implementations, the light sensor 105 may be positioned on the handheld electronic device 101 such that it is unobstructed when the handheld electronic device is held. For example, if the handheld electronic device is a remote control, the light sensor may be positioned such that the light sensor is not located in a portion of the remote control that is designed to be gripped when being held (such as in the same location as a transmitter that the remote control may utilize to communicate with an associated electronic device.

In one or more implementations, the sensing unit 106 may be positioned on the handheld electronic device such that it is triggered when the handheld electronic device. By way of a first example, if the sensing unit includes one or more capacitance touch switches and/or resistance touch switches, the capacitance touch switches and/or resistance touch switches may be located in a portion of the handheld electronic device that is designed to be gripped when the handheld electronic device is held, resulting in the skin of a user's hand contacting the capacitance touch switches and/or resistance touch switches when the user is holding the handheld electronic device. By way of a second example, if the sensing unit includes one or more pressure sensors, the pressure sensors may be located in a portion of the handheld electronic device that is designed to be gripped when the handheld electronic device is held, resulting in the user exerting pressure on one or more of the pressure sensors when the user is holding the handheld electronic device. By way of a third example, if the sensing unit includes one or more illumination sensors additional to the light sensor, the illumination sensors may be located in a portion of the handheld electronic device that is designed to be gripped when the handheld electronic device is held, resulting in the user's hand obscuring one or more of the illumination sensors when the user is holding the handheld electronic device.

Figure 3A:
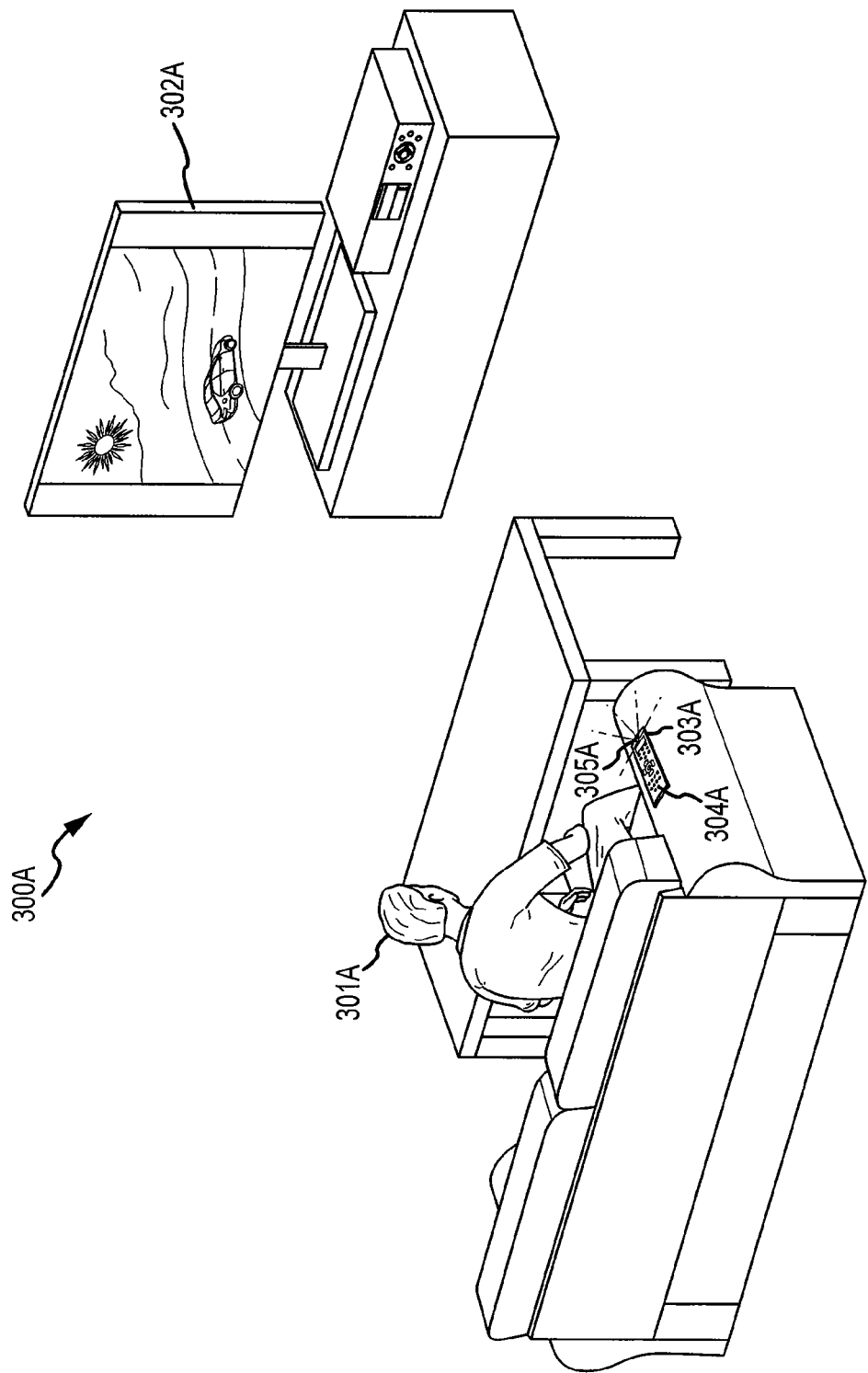

FIGS. 3A-3D are diagrams illustrating a user 301A-301D utilizing a system 300A-300D for smart illumination for a remote control 303A-303D that includes a number of buttons 304A-304D while watching a movie on a television 302A-302D. The system may be the system of FIG. 1. As illustrated in FIG. 3A, the user 301A is watching a movie on a television 302A. A remote control 303A that the user may utilize to control the television is present, but is not held by the user in FIG. 3A. The remote control is configured to illuminate the buttons 304A when the light in the environment in which the remote control is located is below an ambient illumination threshold and when the remote control is held. The environment in which the user is watching the movie on the television is illuminated by a light 305A. As shown, as the light is illuminating the environment in which the remote control is located and the remote control is not being held, the buttons of the remote control are not illuminated.

In FIG. 3B, the user 301B has turned off the light 305B. However, even though the illumination level of the environment in which the remote control 303B is located is below the ambient illumination threshold because the light is off, the buttons 304B of the remote control are not illuminated because the remote control is not held.

Figure 3C:
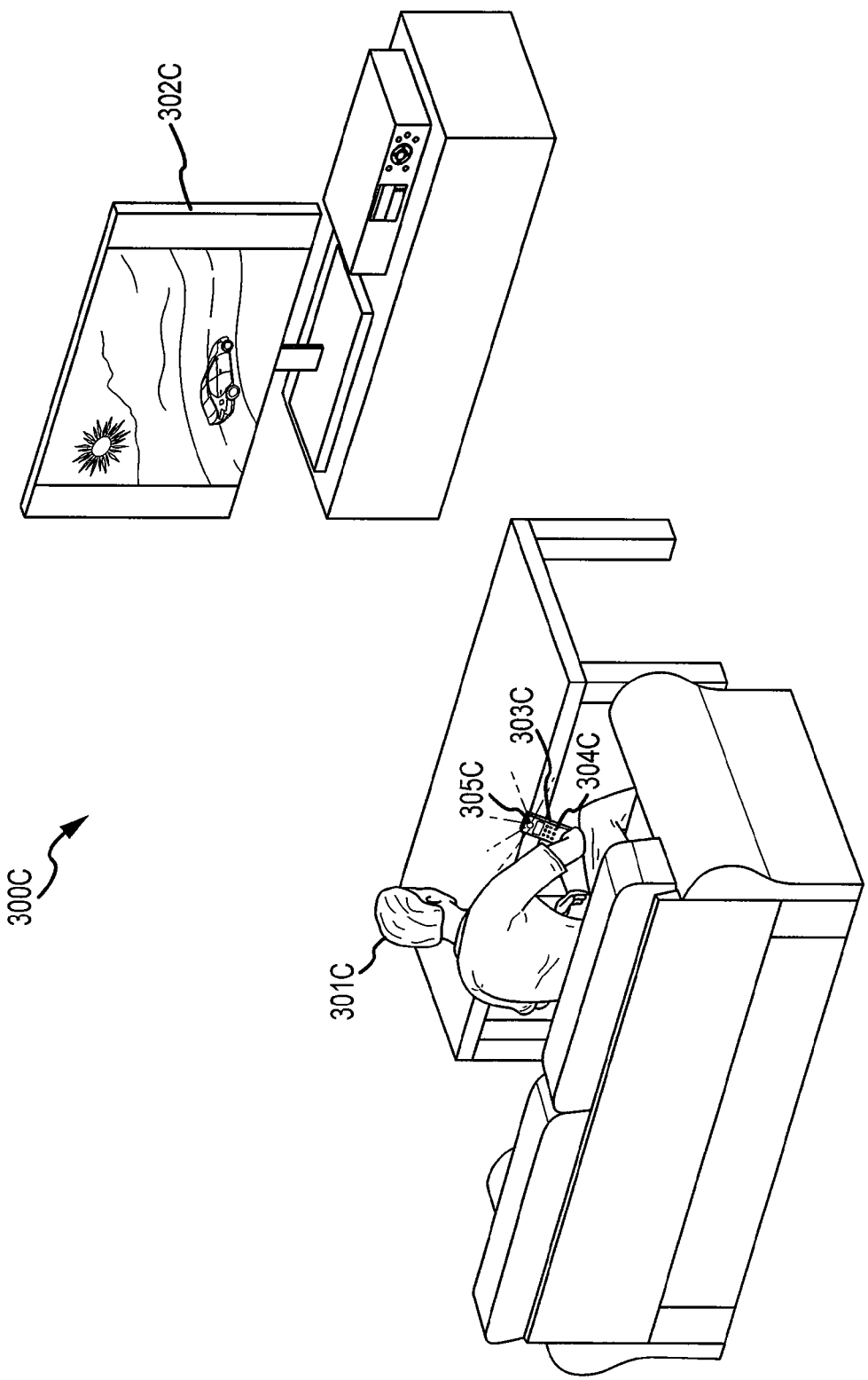
Figure 3D:
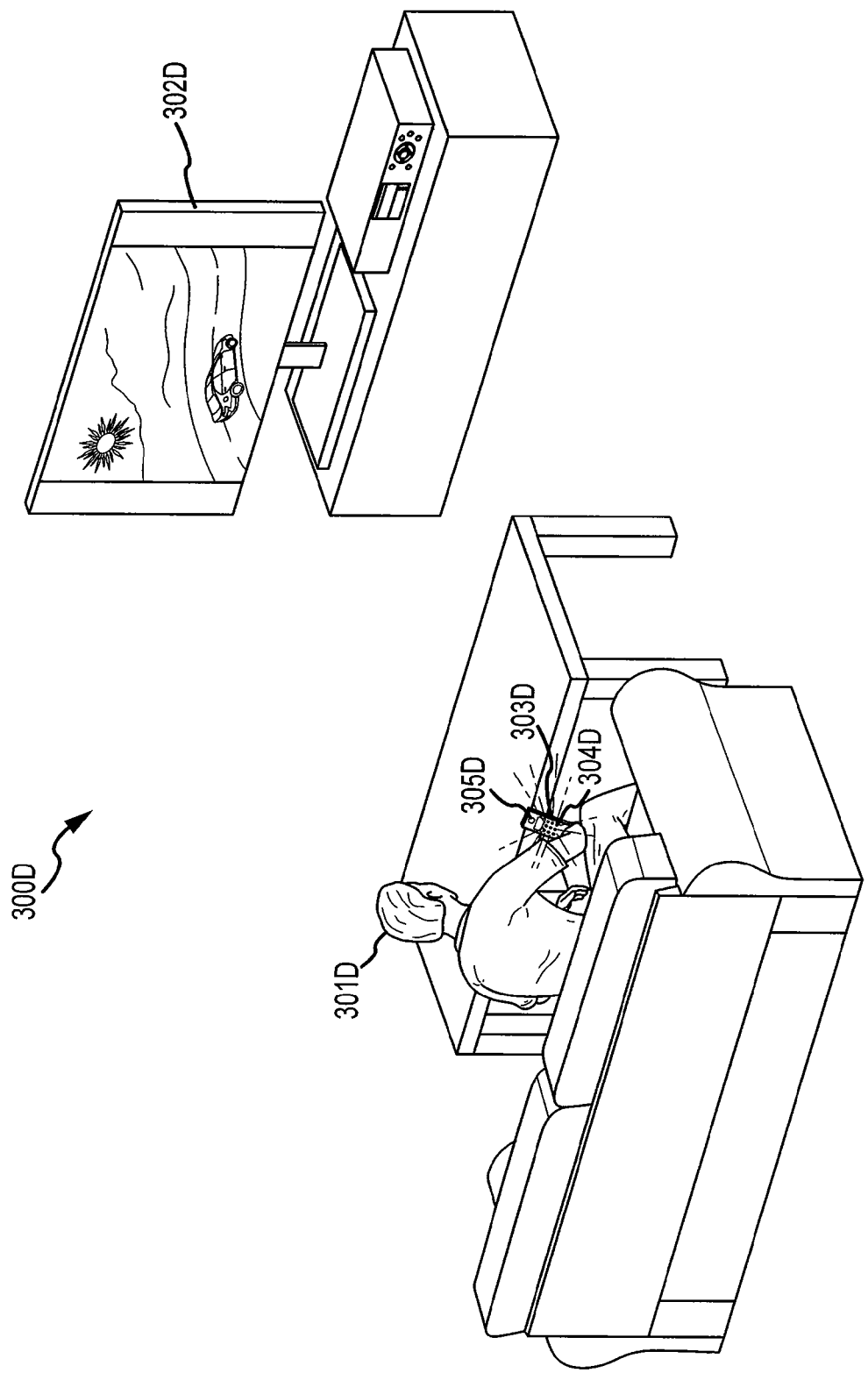

In FIG. 3C, the user 301C has turned back on the light 305C and has picked up the remote control 303C. However, even though the user is holding the remote control, the buttons 304C of the remote control are not illuminated because the illumination level of the environment in which the remote control is located is not below the ambient illumination threshold as the light is on.

In FIG. 3D, the user 301D has again turned off the light 305D. As illustrated, because the illumination level of the environment in which the remote control 303D is located is below the ambient illumination threshold because the light is off and the remote control is held, the buttons 304D of the remote control are illuminated.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for smart illumination for electronic devices, the method comprising:

detecting an illumination level in an area occupied by at least one handheld electronic device utilizing at least one light sensor;

detecting if the at least one handheld electronic device is being held utilizing at least one sensing device;

illuminating at least one control element of the at least one handheld electronic device utilizing at least one illumination element when the illumination level is below an ambient light threshold and the at least one sensing device detects that the at least one handheld electronic device is being held; and ignoring input received via the at least one control element if the at least one sensing device detects that the handheld device is not being held.

2. The method of claim 1, wherein said operation of illuminating at least one control element of the at least one handheld electronic device utilizing at least one illumination element further comprises:

illuminating the at least one control element of the at least one handheld electronic device utilizing the at least one illumination element for a period of time after determining that the illumination level is below the ambient light threshold and the at least one handheld electronic device is being held even if the illumination level is below the ambient light threshold during the period of time or the electronic handheld device is not being held during the period of time.

3. The method of claim 1, wherein said operation of illuminating at least one control element of the at least one handheld electronic device utilizing at least one illumination element further comprises ceasing to illuminate the at least one control element of the at least one handheld electronic device utilizing the at least one illumination element when either the illumination level is not below the ambient light threshold or the at least one handheld electronic device is not being held.

4. The method of claim 3, wherein said operation of ceasing to illuminate the at least one control element of the at least one handheld electronic device utilizing the at least one illumination element when either the illumination level is not below the ambient light threshold or the at least one handheld electronic device is not being held further comprises accounting for illumination from the at least one illumination element when determining that the illumination level is not below the ambient light threshold.

5. The method of claim 1, further comprising determining the ambient light threshold based upon input received from at least one user.

6. The method of claim 1, wherein the at least one sensing device comprises at least one of a capacitance touch switch, a resistance touch switch, a gyroscope, a accelerometer, a pressure sensor, or an additional illumination sensor.

7. The method of claim 1, wherein the at least one illumination element comprises a backlight for the at least one control element.

8. The method of claim 1, wherein the at least one handheld electronic device comprises at least one of a remote control, a phone, or a mobile computer.

9. A handheld electronic device, comprising:
at least one control element;
at least one illumination element that is configured to illuminate the at least one control element;
at least one illumination sensor that detects an illumination level;
at least one sensing device that detects if the handheld device is being held; and
at least one control unit, coupled to the at least one illumination element, the at least one illumination sensor, and the at least one sensing device;
wherein the at least one control unit instructs the at least one illumination element to illuminate the at least one control element when the at least one illumination sensor detects that the illumination level is below an ambient light threshold and the at least one sensing device detects that the handheld electronic device is being held, and wherein the control unit ignores input received via the at least one control element if the at least one sensing device detects that the handheld device is not being held.

10. The handheld electronic device of claim 9, wherein the handheld electronic device comprises at least one of a remote control device, a phone, or a mobile computer.

11. The handheld electronic device of claim 9, wherein the at least one illumination element comprises a backlight for the at least one control element.

12. The handheld electronic device of claim 9, wherein the at least one sensing device comprises at least one of a capacitance touch switch, a resistance touch switch, a gyroscope, a accelerometer, a pressure sensor, or an additional illumination sensor.

13. The handheld electronic device of claim 9, wherein the at least one sensing device is positioned on the handheld electronic device such that the at least one sensing device will be triggered if the handheld electronic device is held.

14. The handheld electronic device of claim 9, wherein the at least one control unit instructs the at least one illumination element to illuminate the at least one control element for a period of time after the at least one illumination sensor detects that the illumination level is below an ambient light threshold and the at least one sensing device detects that the handheld electronic device is being held even if the at least one illumination sensor detects that the illumination level is below the ambient light threshold during the period of time or the at least one sensing device detects that the handheld device is not being held during the period of time.

15. The handheld electronic device of claim 9, wherein the at least one illumination sensor is positioned on the handheld electronic device such that the at least one illumination sensor is unobstructed when the handheld electronic device is held.

16. The handheld electronic device of claim 9, wherein the at least one illumination sensor accounts for illumination from the at least one illumination element when the at least one illumination element is illuminated and the at least one illumination sensor detects whether the illumination level is below the ambient light threshold or not.

17. The handheld electronic device of claim 9, wherein the ambient light threshold is based upon input received from at least one user.

18. The handheld electronic device of claim 9, wherein the at least one illumination element comprises at least one incandescent bulb, at least one fluorescent lamp, at least one compact fluorescent lamp, at least one cold cathode fluorescent lamp, at least one high-intensity discharge lamp, at least one light emitting diode, or at least one organic light emitting diode.

* * * * *